(12) United States Patent
Kagawa

(10) Patent No.: US 9,145,876 B2
(45) Date of Patent: Sep. 29, 2015

(54) MOTOR CONTROL UNIT AND ELECTRIC PUMP UNIT

(71) Applicant: JTEKT Corporation, Osaka-shi (JP)

(72) Inventor: Hiroki Kagawa, Kashiba (JP)

(73) Assignee: JTEKT CORPORATION, Osaka-shi (JP)

( * ) Notice: Subject to any disclaimer, the term of this patent is extended or adjusted under 35 U.S.C. 154(b) by 425 days.

(21) Appl. No.: 13/727,941

(22) Filed: Dec. 27, 2012

(65) Prior Publication Data

US 2013/0171010 A1   Jul. 4, 2013

(30) Foreign Application Priority Data

Dec. 28, 2011   (JP) ................. 2011-288184

(51) Int. Cl.
*F04B 49/06* (2006.01)
*F04B 17/03* (2006.01)
(Continued)

(52) U.S. Cl.
CPC ............ *F04B 17/03* (2013.01); *F04B 49/022* (2013.01); *F04B 49/065* (2013.01);
(Continued)

(58) Field of Classification Search
CPC ........ F04B 17/03; F04B 49/02; F04B 49/022; F04B 49/06; F04B 49/065; F04B 2203/0201; F04B 2203/0209; F04B 2205/05; F04B 2205/11; F04C 11/005; F04C 14/08; F04C 14/06; F04C 14/065; F04C 2270/80; F04C 14/28; F04C 2/10; F16H 61/0021; F16H 61/0031
USPC .................................. 417/44.2, 53
See application file for complete search history.

(56) References Cited

U.S. PATENT DOCUMENTS

| | | | |
|---|---|---|---|
| 6,110,072 | A | 8/2000 | Harada et al. |
| 2004/0029677 | A1 | 2/2004 | Mori et al. |

(Continued)

FOREIGN PATENT DOCUMENTS

| | | |
|---|---|---|
| EP | 2 322 399 A1 | 5/2011 |
| EP | 2 336 565 A1 | 6/2011 |

(Continued)

OTHER PUBLICATIONS

U.S. Appl. No. 14/369,312, filed Jun. 27, 2014, Kagawa, et al.

(Continued)

*Primary Examiner* — Charles Freay
*Assistant Examiner* — Philip Stimpert
(74) *Attorney, Agent, or Firm* — Oblon, McClelland, Maier & Neustadt, L.L.P.

(57) ABSTRACT

A control signal output unit obtains a motor control signal by applying a reduction amount for a current command value obtained by an over-power suppression control unit to a current command value from a host control unit. The over-power suppression control unit includes a hydraulic pressure estimation unit that estimates hydraulic pressure, and a current command value correction amount calculation unit that compares a target hydraulic pressure with an estimated hydraulic pressure and outputs the reduction amount for the current command value. Load information indicating whether a load on the pump is a low load or a high load that is higher than the low load is input into a control circuit from the host control unit, and the over-power suppression control unit changes the target hydraulic pressure in accordance with a magnitude of the load indicated by the load information.

18 Claims, 4 Drawing Sheets

(51) Int. Cl.
*F04B 49/02* (2006.01)
*F04C 14/06* (2006.01)
*F04C 14/08* (2006.01)
*F16H 61/00* (2006.01)
*F04C 11/00* (2006.01)
*F04C 2/10* (2006.01)
*F04C 14/28* (2006.01)

(52) U.S. Cl.
CPC .............. *F04C 11/005* (2013.01); *F04C 14/06* (2013.01); *F04C 14/08* (2013.01); *F16H 61/0021* (2013.01); *F16H 61/0031* (2013.01); *F04B 2203/0201* (2013.01); *F04B 2203/0209* (2013.01); *F04C 2/10* (2013.01); *F04C 14/065* (2013.01); *F04C 14/28* (2013.01); *F04C 2270/80* (2013.01)

(56) References Cited

U.S. PATENT DOCUMENTS

2009/0097986 A1* 4/2009 Nakata et al. ............... 417/44.2
2011/0129356 A1 6/2011 Kobayashi et al.
2011/0194954 A1 8/2011 Sakata et al.

FOREIGN PATENT DOCUMENTS

| | | |
|---|---|---|
| JP | 2002-206630 | 7/2002 |
| JP | 2004-144020 | 5/2004 |
| JP | 2009-185915 | 8/2009 |
| JP | 2010-116914 | 5/2010 |

OTHER PUBLICATIONS

The Extended European Search Report issued Apr. 18, 2013, in Application No. / Patent No. 12199034.5-1608.

U.S. Appl. No. 13/727,917, filed Dec. 27, 2012, Uda, et al.

Office Action mailed Jun. 23, 2015, in Japanese Patent Application No. 2011-288184 (partial English translation).

* cited by examiner

MOTOR CONTROL UNIT AND ELECTRIC PUMP UNIT

The disclosure of Japanese Patent Applications No. 2011-288184 filed on Dec. 28, 2011 including the specification, drawings and abstract, is incorporated herein by reference in its entirety.

BACKGROUND OF THE INVENTION

1. Field of the Invention

The invention relates generally to a motor control unit and an electric pump unit, and more specifically to a motor control unit for an electric pump unit suitable for supplying hydraulic pressure to a transmission of an automobile and an electric pump unit that includes such a motor control unit.

2. Description of Related Art

As a device that supplies hydraulic pressure to a transmission of an automobile, a device that includes only a main pump driven by an engine that is a main power supply has been used conventionally.

However, when an idling stop function of stopping the engine while the automobile stops is provided, two hydraulic sources, that is, a main pump, which has been used conventionally, and an auxiliary pump driven by an electric motor that uses a battery as a power supply are required to secure supply of hydraulic pressure to a drive system such as the transmission even while the engine is stopped by the idling stop function. Japanese Patent Application Publication No. 2010-116914 (JP 2010-116914 A) describes an example of a hydraulic pressure supply device for a transmission, which includes such two hydraulic sources. The hydraulic pressure supply device supplies hydraulic pressure to a transmission, and an auxiliary pump constitutes an electric pump unit together with an electric motor for driving the auxiliary pump and a motor control unit. When the hydraulic pressure in a main discharge oil passage from a main pump to the transmission is equal to or higher than a predetermined value, driving of the auxiliary pump is stopped. On the other hand, when the hydraulic pressure in the main discharge oil passage is lower than the predetermined value, the auxiliary pump is driven. The hydraulic pressure that is supplied from the main pump is several tens of times higher than the hydraulic pressure that is supplied from the auxiliary pump, and the measurement range of a hydraulic sensor is set based on the magnitude of the hydraulic pressure that is supplied from the main pump. Therefore, if the hydraulic pressure that is supplied from the main pump is used for hydraulic control of the auxiliary pump, measurement accuracy is not sufficient, and it is difficult to execute the hydraulic control. When the auxiliary pump is driven, the electric motor is driven based on a current command value provided from a host ECU. Therefore, it is possible to obtain hydraulic pressure that is equal to or higher than a target hydraulic pressure.

In the conventional electric pump unit, the electric motor is driven according to the current command value regardless of whether there is any load on the electric motor or not, which causes a state where an output is large beyond necessity (over power). Such a state is not preferable because power consumption is unnecessarily large and heat and noise are generated. The target hydraulic pressure needs to be set in order to suppress over power. However, in order to supply a wide range of hydraulic pressures by a single pump, how to deal with changes in the load on the pump is an issue to be addressed.

SUMMARY OF THE INVENTION

It is an object of the invention to provide a motor control unit and an electric pump unit that are capable of minimizing generation of heat and noise by suppressing over power, and dealing with changes in a load.

An aspect of the invention relates to a motor control unit that controls, based on hydraulic pressure, an electric motor that drives a pump that sucks in and discharges oil, including: a control circuit that includes a control signal output unit that outputs a motor control signal; and a drive circuit that is actuated upon reception of the motor control signal, and that supplies driving electric power to the electric motor. The control circuit further includes an over-power suppression control unit that suppresses over power by reducing a current command value from a host control unit. The control signal output unit obtains the motor control signal by applying a reduction amount for the current command value, which is obtained by the over-power suppression control unit, to the current command value from the host control unit. The over-power suppression control unit includes a current command value correction amount calculation unit that compares a target hydraulic pressure with a present hydraulic pressure and outputs the current command value reduction amount for over-power suppression control when the present hydraulic pressure is higher than the target hydraulic pressure. Load information indicating whether a load on the pump is a low load or a high load that is higher than the low load is input into the control circuit from the host control unit, and the over-power suppression control unit changes the target hydraulic pressure in accordance with a magnitude of the load indicated by the load information.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF EMBODIMENTS

Hereinafter, an embodiment in which the invention is applied to a hydraulic pressure supply device for a transmission of an automobile will be described with reference to the accompanying drawings.

Figure 1:
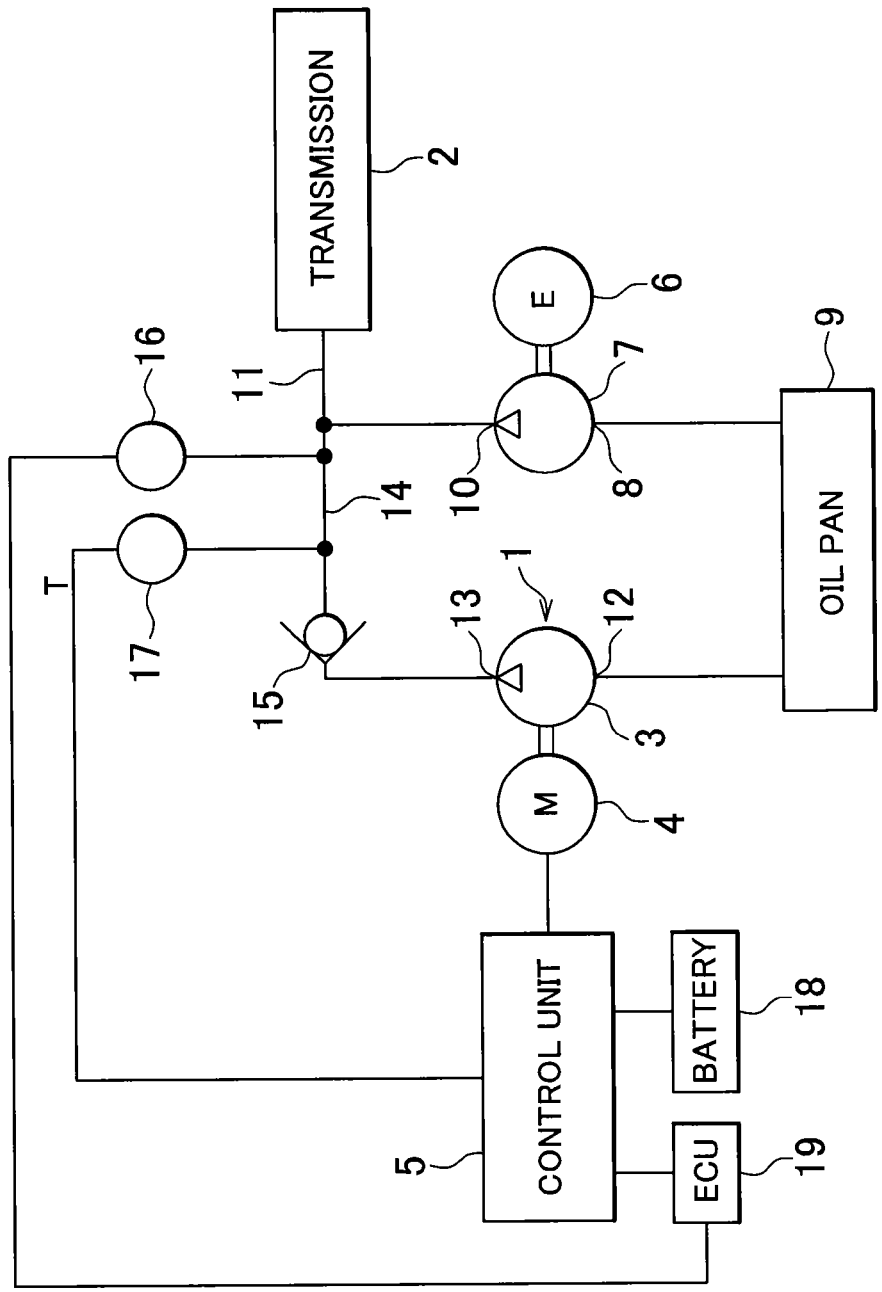
FIG. 1 is a schematic configuration diagram illustrating an electric pump unit according to an embodiment of the invention, which is applied to a hydraulic pressure supply device of a transmission of an automobile.

FIG. 1 is a schematic configuration diagram illustrating an example of a hydraulic pressure supply device that supplies hydraulic pressure to a transmission (continuously variable transmission) of an automobile.

In FIG. 1, the hydraulic pressure supply device includes an electric pump unit 1 for a transmission. The electric pump unit 1 is used to compensate for a drop in hydraulic pressure during an idling stop, which occurs in a transmission 2 of an automobile. The electric pump unit 1 includes a pump 3, an electric motor 4 for driving the pump 3, and a motor control unit 5. The pump 3 is an auxiliary pump for supplying hydraulic pressure. The motor control unit 5 controls the motor 4.

The motor 4 is a sensorless control brushless DC motor, and the auxiliary pump 3 is an internal gear pump. It is preferable that the pump 3 and the motor 4 be provided together in a single housing. The motor control device 5 may be also provided in the single housing where the pump 3 and the motor 4 are provided.

The hydraulic pressure supply device includes a main pump 7 that is driven by an engine 6, in addition to the electric pump unit 1 that includes the auxiliary pump 3.

An oil inlet 8 of the main pump 7 is connected to an oil pan 9. An oil outlet 10 is connected to the transmission 2 through a main discharge oil passage 11. An oil inlet 12 of the auxiliary pump 3 is connected to the oil pan 9. An oil outlet 13 is connected to the main discharge oil passage 11 through an auxiliary discharge oil passage 14. The auxiliary discharge oil passage 14 is provided with a check valve 15 that prevents backflow of the oil from the main discharge oil passage 11-side to the auxiliary pump 3. The main discharge oil passage 11 is provided with a hydraulic sensor 16 and an oil-temperature sensor 17.

A host ECU (host control unit) 19, which is a computer that controls a battery 18, which serves as a DC power supply, the engine 6, and the transmission 2, is connected to the motor control unit 5. The host ECU 19 monitors the hydraulic pressure in the main discharge oil passage 11 based on an output from the hydraulic sensor 16.

When the hydraulic pressure is equal to or higher than a predetermined set value, the host ECU 19 outputs an auxiliary pump stop signal to the motor control unit 5. On the other hand, when the hydraulic pressure is lower than the set value, the host ECU 19 outputs an auxiliary pump drive signal to the motor control unit 5.

When the auxiliary pump stop signal is output from the host ECU 19, the motor control unit 5 stops driving of the motor 4 to stop driving of the auxiliary pump 3. On the other hand, when the auxiliary pump drive signal is output, the motor control unit 5 drives the motor 4 to drive the auxiliary pump 3.

While the engine 6 is being driven, the main pump 7 is driven by the engine 6. The hydraulic pressure in the main discharge oil passage 11 is usually equal to or higher than the set value, and therefore the driving of the auxiliary pump 3 is stopped. At this time, the oil is supplied from the main pump 7 to the transmission 2 through the main discharge oil passage 11. Further, backflow of the oil from the main discharge oil passage 11 to the auxiliary pump 3 is prevented by the check valve 15.

While the engine 6 is stopped, the hydraulic pressure in the main discharge oil passage 11 is usually approximately zero, which is lower than the set value, so that the auxiliary pump 3 is driven. Therefore, the oil is supplied from the auxiliary pump 3 to the transmission 2 through the auxiliary discharge oil passage 14 and the main discharge oil passage 11.

When the hydraulic pressure in the main discharge oil passage 11 is lower than the set value although the engine 6 is driven, the auxiliary pump 3 is driven, so that the oil is supplied from the auxiliary pump 3 to the main discharge oil passage 11 through the auxiliary discharge oil passage 14.

When the auxiliary pump 3 is driven, the host ECU 19 provides an operation command to the electric pump unit 1 when idling conditions are satisfied. The motor control unit 5 of the electric pump unit 1 controls the motor 4 based on a current command value provided from the host ECU 19.

Figure 2:
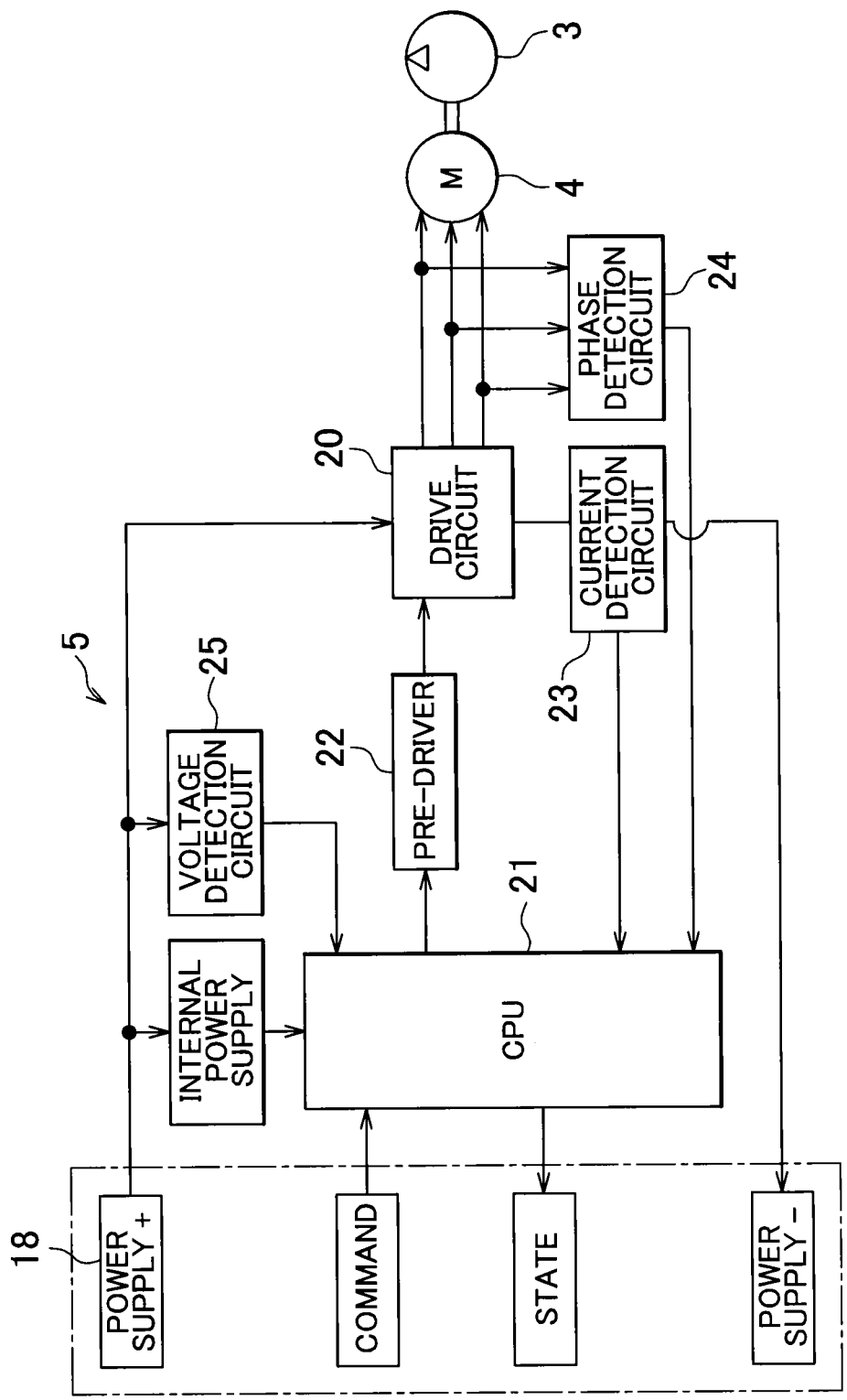
FIG. 2 is a block diagram illustrating an example of the schematic configuration of hardware of a motor control unit according to the invention.

FIG. 2 is a schematic configuration diagram illustrating a specific example of hardware of the motor control unit 5. The motor control unit 5 drives the motor 4 according to a one-sided PWM method, using the battery 18 as an internal power supply. The motor control unit 5 includes a drive circuit 20, a CPU (control circuit) 21, a pre-driver 22, a current detection circuit 23, a phase detection circuit 24, and a voltage detection circuit 25. The drive circuit 20 drives the motor 4. The CPU (control circuit) 21 includes a motor control signal output unit that controls the drive circuit 20. The pre-driver 22 outputs a gate drive signal to each of switching elements that constitute the drive circuit 20, based on the motor control signal output from the CPU 21. The current detection circuit 23 detects an input current that is input into the drive circuit 20. The phase detection circuit 24 detects the phase of a rotor of the motor 4. The voltage detection circuit 25 detects a power-supply voltage.

The hardware configuration shown in FIG. 2 is basically well known, and a well-known appropriate configuration may be employed.

The drive circuit 20 is a switching circuit that includes a plurality of switching elements (not shown) used to control power supply from the battery 18 to the motor 4. The CPU 21 estimates rotational position of the rotor (not shown) of the motor 4 on the basis of a phase voltage of each phase of the motor 4, and controls each of the switching elements of the drive circuit 20 according to the PWM method based on the estimated rotational position. In this way, the power supply to the motor 4 is controlled. The current detection circuit 23 detects an input current that is input into the drive circuit 20, and inputs the detection result into the CPU 21. The phase detection circuit 24 detects the phase of the rotor of the motor 4, and inputs the detection result into the CPU 21 so that the detection result is used to determine the rotation speed of the motor 4. A direct voltage from the battery 18 is applied to the drive circuit 20 and the CPU 21, and the direct voltage becomes an input voltage that is input into the drive circuit 20.

Figure 3:
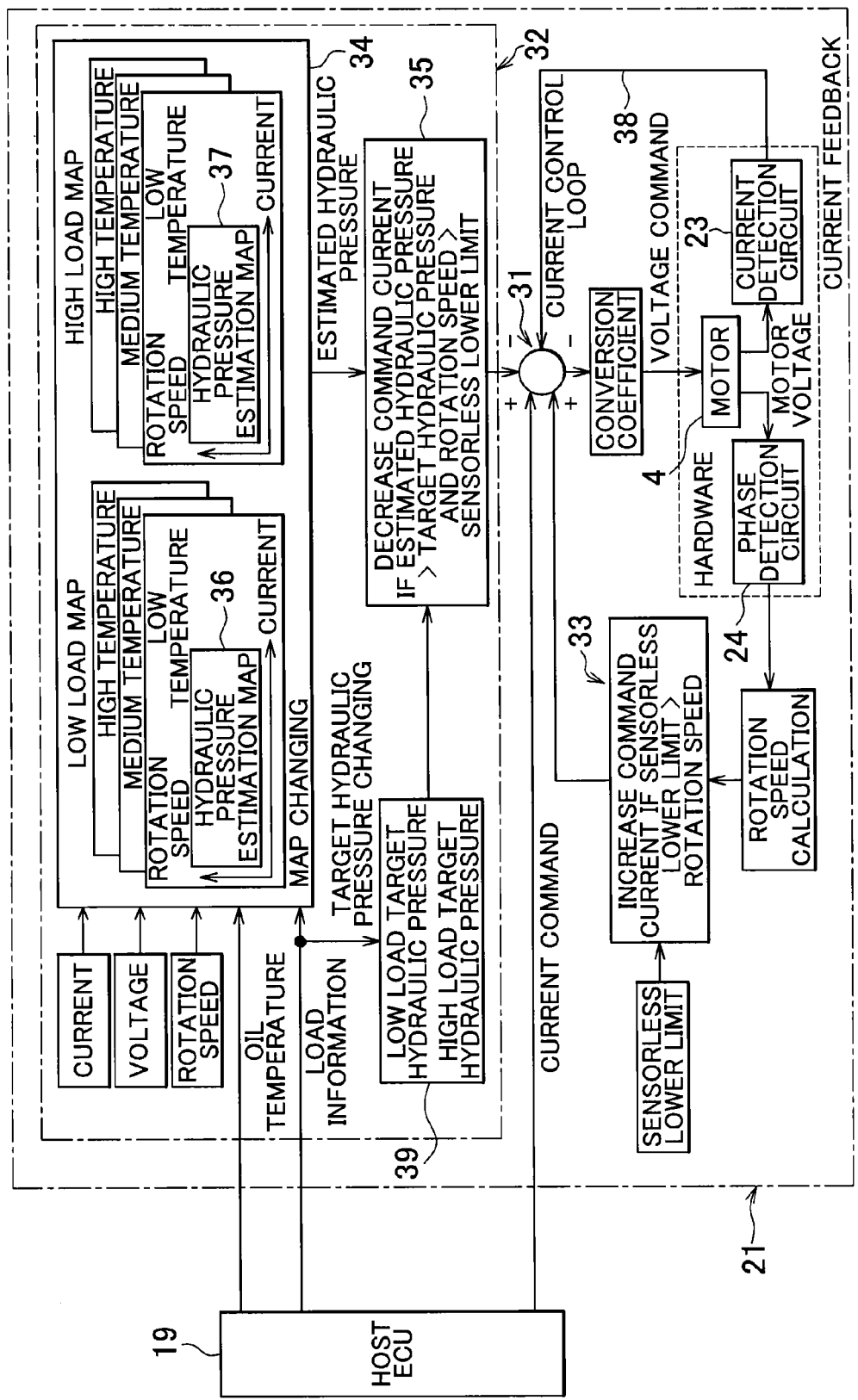
FIG. 3 is a block diagram illustrating an example of the schematic configuration of software of the motor control unit according to the invention.

FIG. 3 illustrates the configuration of software of the CPU (control circuit) 21.

In FIG. 3, based on a current command value from the host ECU 19, the CPU 21 corrects the current command value and outputs a motor control signal. The CPU 21 includes a control signal output unit 31, an over-power suppression control unit 32, and a minimum-output maintaining control unit 33. The control signal output unit 31 outputs a motor control signal based on the current command value from the host ECU 19. The over-power suppression control unit 32 reduces the current command value from the host ECU 19 to suppress over power. The minimum-output maintaining control unit 33 increases the current command value from the host ECU 19 to execute control for maintaining the minimum rotation speed for sensorless control.

In addition to the current command value, oil temperature information and load information are input into the CPU 21 from the host ECU 19. As the oil temperature information, the information indicating in which of a low-temperature zone, a medium-temperature zone, and a high-temperature zone the oil temperature is, is input into the CPU 21. In which of the low-temperature zone, the medium-temperature zone, and the high-temperature zone the oil temperature is, is determined based on an output from the oil-temperature sensor 17 provided on the main discharge oil passage 11. As the load information, the information indicating whether a load is a low load indicative of an idling stop state (the vehicle speed is zero) or a high load that is higher than the low load is input into the CPU 21. The high load corresponds to, for example, a state where the auxiliary pump 3 is driven when the vehicle speed is not zero.

The over-power suppression control unit 32 includes a hydraulic pressure estimation calculation unit 34 and a current command value correction amount calculation unit 35. The current command value correction amount calculation unit 35 compares an estimated hydraulic pressure obtained by the hydraulic pressure estimation calculation unit 34 with a target hydraulic pressure, to obtain a reduction amount for the current command value input into the control signal output unit 31 from the host ECU 19.

The control signal output unit 31 obtains a current command value by executing current control, and a voltage command value obtained by using a conversion coefficient that causes an actual current value to follow the current command value is supplied to the motor 4. The control signal output unit 31 has a current control loop 38 used to execute current feedback control so as to cause the actual current value to follow the current command value.

The over-power suppression control unit 32 reduces the current command value from the host ECU 19, as will be described later. The minimum-output maintaining control unit 33 compares a lower-limit rotation speed for sensorless control with an actual rotation speed of the motor 4, which is detected based on the phase of the rotor obtained by the phase detection circuit 24. When the actual rotation speed of the motor 4 is lower than the lower-limit rotation speed, the minimum-output maintaining control unit 33 increases the current command value from the host ECU 19.

Figure 4:
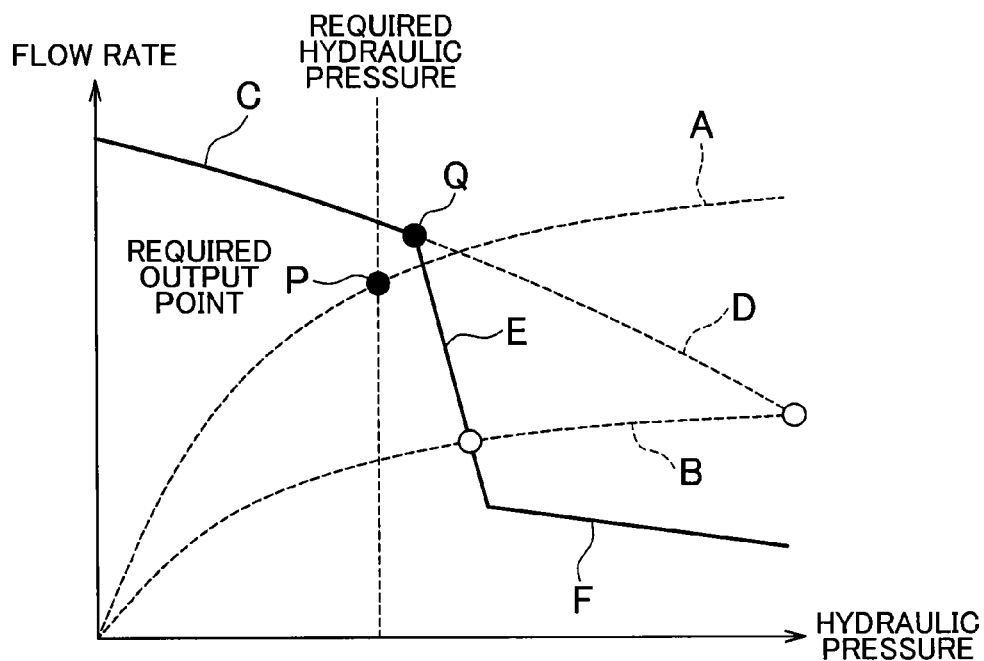
FIG. 4 is a graph illustrating a typical example of hydraulic pressure-flow rate curve that is an output characteristic of a pump, which is obtained by the motor control unit of the electric pump unit according to the invention.

FIG. 4 illustrates a characteristic of the auxiliary pump (hereinafter referred to as the "pump") 3 that is feasible due to the provision of the over-power suppression control unit 32 and the minimum-output maintaining control unit 33.

Curves indicated by dashed lines A, B in FIG. 4 indicate load curves that are defined by taking into account variations in the state of the transmission 2. In FIG. 4, A indicates a load curve at a maximum oil leakage in the CVT (continuously variable transmission) of the transmission 2. In FIG. 4, B indicates a load curve at a minimum oil leakage in the CVT. The pump 3 is required to provide an output that exceeds a required output point P that is on the load curve at the maximum oil leakage in the CVT (a required hydraulic pressure value is higher than the hydraulic pressure value at the point P). The hydraulic pressure-flow rate curve of the pump 3 capable of satisfying the above-described requirement needs to have a part C indicated by a continuous line C. If no additional control is executed, such hydraulic pressure-flow rate curve of the pump 3 has a part indicated by a dashed line D where the flow rate decreases gradually (continually) as the hydraulic pressure increases. Because the hydraulic pressure in the part shown by the dashed line D is higher than the required hydraulic pressure, the hydraulic pressure does not become insufficient in this part, but the hydraulic pressure in this part is more than required (over power) with respect to the dashed line B, which is the load curve at the minimum oil leakage in the CVT. The over power is unfavorable in terms of energy saving and also in terms of prevention of heat generation and noise generation.

In view of this, when the motor control unit 5 according to the invention executes the control, the output from the pump 3 follows a hydraulic pressure-flow rate curve indicated by a continuous line E after the part indicated by the continuous line C (that is, after the required output point P). In the part indicated by the continuous line E, the output (obtained by multiplying the hydraulic pressure by the flow rate) suddenly starts decreasing at a point Q that serves as an inflection point. Further, a minimum rotation speed of the motor 4 is set in order to execute sensorless control, and a minimum curved part F is set so that the flow rate is secured to some extent even if the hydraulic pressure is high.

By controlling the motor 4 such that the output of the pump 3 follows the hydraulic pressure-flow rate curve formed of the continuous line C having the inflection point Q, the continuous line E, and the continuous line F, the variation in the state of the transmission 2 is taken into account. As a result, a required output is obtained even at a high limit of the variation in the state of the transmission 2. In addition, it is possible to execute control so as not to cause over power.

Figure 5:
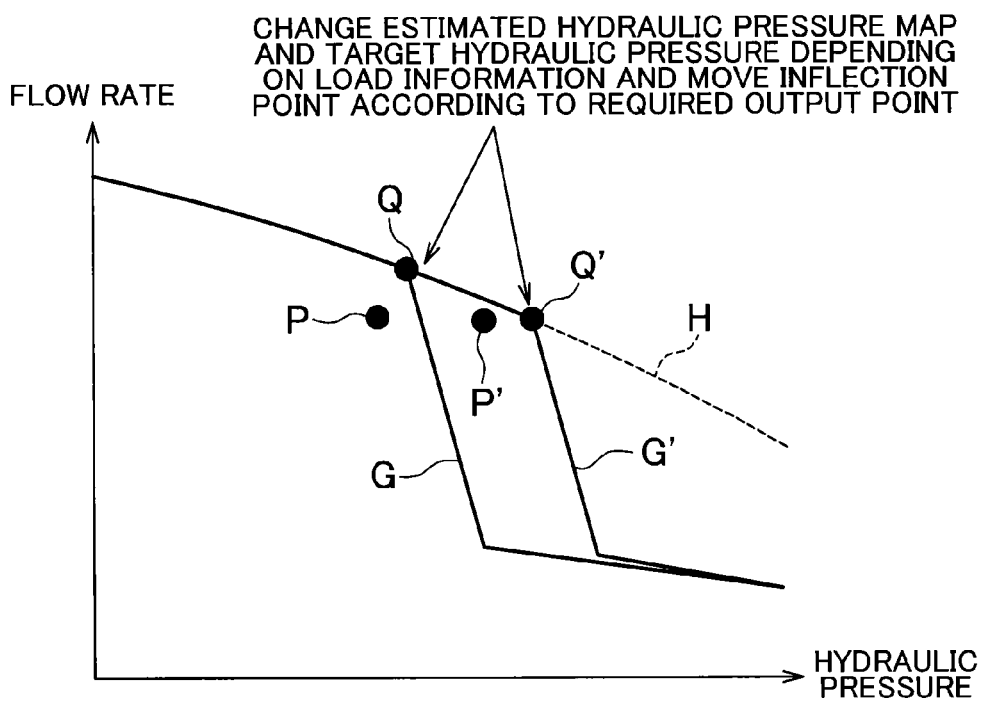
FIG. 5 is a graph illustrating different hydraulic pressure-flow rate curves that correspond to different loads in terms of the output characteristic of the pump, which is obtained by the motor control unit of the electric pump unit according to the invention.

FIG. 4 described as above corresponds to a condition for a low load state. In hydraulic pressure-flow rate curve that corresponds to a condition for a high load state, as shown in FIG. 5, the hydraulic pressure at a required output point P' is higher than that at the required output point P in the low load state, and accordingly, the hydraulic pressure at an inflection point Q' is also higher than that at the inflection point Q in the low load state.

The hydraulic pressure is estimated based on a power-supply current (or a motor current) of the electric pump unit 1 and a motor rotation speed, instead of using the value detected by the hydraulic sensor 16 on the main discharge oil passage 11. More specifically, a discharge hydraulic pressure is estimated by the hydraulic pressure estimation calculation unit 34 based on the oil temperature obtained from the host ECU 19 and the power-supply current (or the motor current), the motor rotation speed, and the power-supply voltage obtained in the electric pump unit 1. The hydraulic pressure estimation calculation unit 34 has a data table (hydraulic pressure estimation maps 36, 37) that indicates the correlation between a motor rotation speed and a current for each oil temperature, which is set in advance. An estimated hydraulic pressure is obtained from the data table.

As the hydraulic pressure estimation maps 36, 37, different maps one of which is used in a low load condition and the other of which is used in a high load condition, that is, the low load hydraulic pressure estimation map 36 and the high load hydraulic pressure estimation map 37 are prepared.

The hydraulic pressure estimation maps 36, 37 are stored in the CPU 21. When an operation command is provided from the host ECU 19 to the electric pump unit 1, the target hydraulic pressure is changed in a target-hydraulic pressure changing unit 39 based on the load information transmitted together with the operation instruction. In the low load state, the motor 4 is controlled such that the estimated hydraulic pressure obtained from the low load hydraulic pressure estimation map 36 reaches the target hydraulic pressure. In the high load state, the motor 4 is controlled such that the estimated hydraulic pressure obtained from the high load hydraulic pressure estimation map 37 reaches the target hydraulic pressure. The target hydraulic pressures are determined so as to achieve a low load hydraulic pressure-flow rate curve G and a high load hydraulic pressure-flow rate curve G' shown in FIG. 5, respectively. As a result, it is possible to execute over-power suppression control by which energy saving is achieved and heat generation and noise generation are suppressed at a higher level than the case of a hydraulic pressure-flow rate curve H, where the above control is not executed.

In this way, control to attain an appropriate output (without any insufficiency relative to the required output or any over power) is executed not only in the idling stop state but also in a case where a load is higher than that in the idling stop state, without providing a hydraulic sensor for over-power suppression. This makes it possible to minimize heat generation and noise generation.

The hydraulic pressure may be estimated without using the hydraulic pressure estimation maps 36, 37. A hydraulic pressure estimation equation, which uses the oil temperature, the power-supply current (or the motor current), the motor rotation speed, and the power-supply voltage, may be stored, and the hydraulic pressure may be estimated according to the hydraulic pressure estimation equation.

As each of the hydraulic pressure estimation maps 36, 37, only a reference map for one condition (reference temperature) may be used. Further, each of the hydraulic pressure estimation maps 36, 37 may be formulated so as to deal with a plurality of temperature zones by combining the reference map with the low-temperature adjustment factor, the high-temperature adjustment factor, and the like, with each other. Alternatively, as each of the hydraulic pressure estimation maps 36, 37, a plurality of hydraulic pressure estimation maps may be set so as to deal with a plurality of temperature zones.

If a plurality of hydraulic pressure estimation maps is provided so as to deal with a plurality of oil temperature zones, it is possible to further increase the accuracy of estimating the hydraulic pressure. However, in this case, additional work to formulate the plurality of hydraulic pressure estimation maps is required. In order to solve this problem, the following configuration may be employed. That is, for example, with regard to the high-temperature zone, normal-temperature hydraulic pressure estimation maps 36, 37 are used as high-temperature-zone hydraulic pressure estimation maps. With the use of the normal-temperature hydraulic pressure estimation maps 36, 37, the estimated oil temperature is obtained using an adjustment factor for increasing the estimated hydraulic pressure. With regard to the low temperature zone, maps that are the same as the normal-temperature hydraulic pressure estimation maps 36, 37 are used and the minimum value of the rotation speed of the motor 4 in the low-temperature zone is set higher than the minimum values of the rotation speed of the motor 4 in the other zones.

In the above-described embodiment, the auxiliary pump 3 is switched between the driving mode and the stop mode based on the hydraulic pressure in the main discharge oil passage 11. Alternatively, the auxiliary pump 3 may be stopped while the engine 6 is driven, and the auxiliary pump 3 may be driven while the engine 6 is stopped. The configuration of the electric pump unit 1 is not limited to the configuration in the above embodiment and may be modified as needed. Further, the invention may be applied to devices other than the hydraulic pressure supply device for a transmission of an automobile.

As described above, with the electric pump unit according to the invention, it is possible to decrease the actual hydraulic pressure regardless of a change in the load while the target oil temperature is ensured. Therefore, control that does not cause any insufficiency relative to the required output or any over power is executed. As a result, it is possible to minimize heat generation and noise generation due to over power.

What is claimed is:

1. A motor control unit that controls, based on hydraulic pressure, comprising:
   a control circuit that includes a control signal output unit that outputs a motor control signal; and
   a drive circuit that is actuated upon reception of the motor control signal, and that supplies driving electric power, wherein, the control circuit further includes an over-power suppression control unit that suppresses over power by reducing a current command value from a host control unit, the control signal output unit obtains the motor control signal by applying a reduction amount for the current command value, which is obtained by the over-power suppression control unit, to the current command value from the host control unit, the over-power suppression control unit includes a current command value correction amount calculation unit that compares a target hydraulic pressure with a present hydraulic pressure and outputs the current command value reduction amount for over-power suppression control when the present hydraulic pressure is higher than the target hydraulic pressure, and load information indicating whether a load is a low load or a high load that is higher than the low load is input into the control circuit from the host control unit, and the over-power suppression control unit changes the target hydraulic pressure in accordance with a magnitude of the load indicated by the load information.

2. The motor control device according to claim 1, wherein the over-power suppression control unit includes a hydraulic pressure estimation unit that estimates hydraulic pressure based on at least a motor current and a motor rotation speed, and the estimated hydraulic pressure obtained by the hydraulic pressure estimation unit is used as the present hydraulic pressure.

3. The motor control device according to claim 2, wherein:
the hydraulic pressure estimation unit obtains the estimated hydraulic pressure based on hydraulic pressure estimation maps that indicate a correlation between the motor current and the motor rotation speed, and the estimated hydraulic pressure; and
the hydraulic pressure estimation maps are formulated to be different from each other so as to correspond to different pieces of load information.

4. The motor control device according to claim 2, wherein:
the hydraulic pressure estimation unit estimates the hydraulic pressure based further on an oil temperature.

5. The motor control device according to claim 3, wherein:
the hydraulic pressure estimation unit estimates the hydraulic pressure based further on an oil temperature.

6. The motor control device according to claim 2, wherein:
the hydraulic pressure estimation unit estimates the hydraulic pressure based further on a power-supply voltage.

7. The motor control device according to claim 3, wherein:
the hydraulic pressure estimation unit estimates the hydraulic pressure based further on a power-supply voltage.

8. The motor control device according to claim 4, wherein:
the hydraulic pressure estimation unit estimates the hydraulic pressure based further on a power-supply voltage.

9. The motor control device according to claim 5, wherein:
the hydraulic pressure estimation unit estimates the hydraulic pressure based further on a power-supply voltage.

10. An electric pump unit, comprising:
a pump that sucks in and discharges oil;
an electric motor for driving the pump; and
a motor control unit that controls the electric motor based on hydraulic pressure, wherein:
the motor control unit is a motor control unit according to claim 1.

11. An electric pump unit, comprising:
a pump that sucks in and discharges oil;
an electric motor for driving the pump; and
a motor control unit that controls the electric motor based on hydraulic pressure, wherein:
the motor control unit is a motor control unit according to claim 2.

12. An electric pump unit, comprising:
a pump that sucks in and discharges oil;
an electric motor for driving the pump; and
a motor control unit that controls the electric motor based on hydraulic pressure, wherein:
the motor control unit is a motor control unit according to claim 3.

13. An electric pump unit, comprising:
a pump that sucks in and discharges oil;
an electric motor for driving the pump; and
a motor control unit that controls the electric motor based on hydraulic pressure, wherein:
the motor control unit is a motor control unit according to claim 4.

14. An electric pump unit, comprising:
a pump that sucks in and discharges oil;
an electric motor for driving the pump; and
a motor control unit that controls the electric motor based on hydraulic pressure, wherein:
the motor control unit is a motor control unit according to claim 5.

15. An electric pump unit, comprising:
a pump that sucks in and discharges oil;
an electric motor for driving the pump; and
a motor control unit that controls the electric motor based on hydraulic pressure, wherein:
the motor control unit is a motor control unit according to 6.

16. An electric pump unit, comprising:
a pump that sucks in and discharges oil;
an electric motor for driving the pump; and
a motor control unit that controls the electric motor based on hydraulic pressure, wherein:
the motor control unit is a motor control unit according to claim 7.

17. An electric pump unit, comprising:
a pump that sucks in and discharges oil;
an electric motor for driving the pump; and
a motor control unit that controls the electric motor based on hydraulic pressure, wherein:
the motor control unit is a motor control unit according to claim 8.

18. An electric pump unit, comprising:
a pump that sucks in and discharges oil;
an electric motor for driving the pump; and
a motor control unit that controls the electric motor based on hydraulic pressure, wherein:
the motor control unit is a motor control unit according to claim 9.

* * * * *